Figure 1:
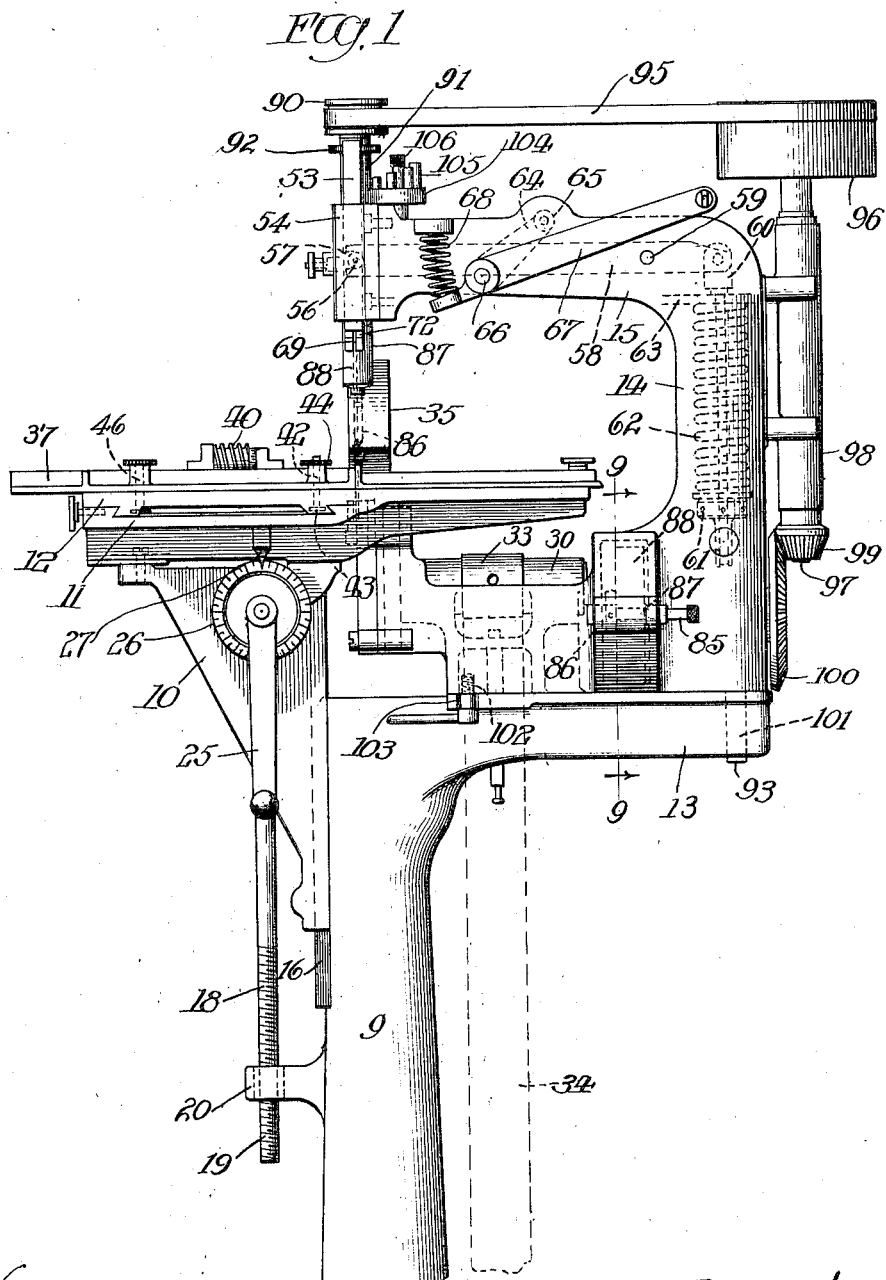

H. G. MILLER.
SAWING AND TRIMMING MACHINE WITH ROUTER AND JIG SAW ATTACHMENT.
APPLICATION FILED JULY 13, 1908.

1,030,598.

Patented June 25, 1912.
5 SHEETS—SHEET 1.

Witnesses
Wm. M. Haenel
N. Perry Hahn

Inventor:
Harry G. Miller.
By Jones, Addington & Ames
Attys.

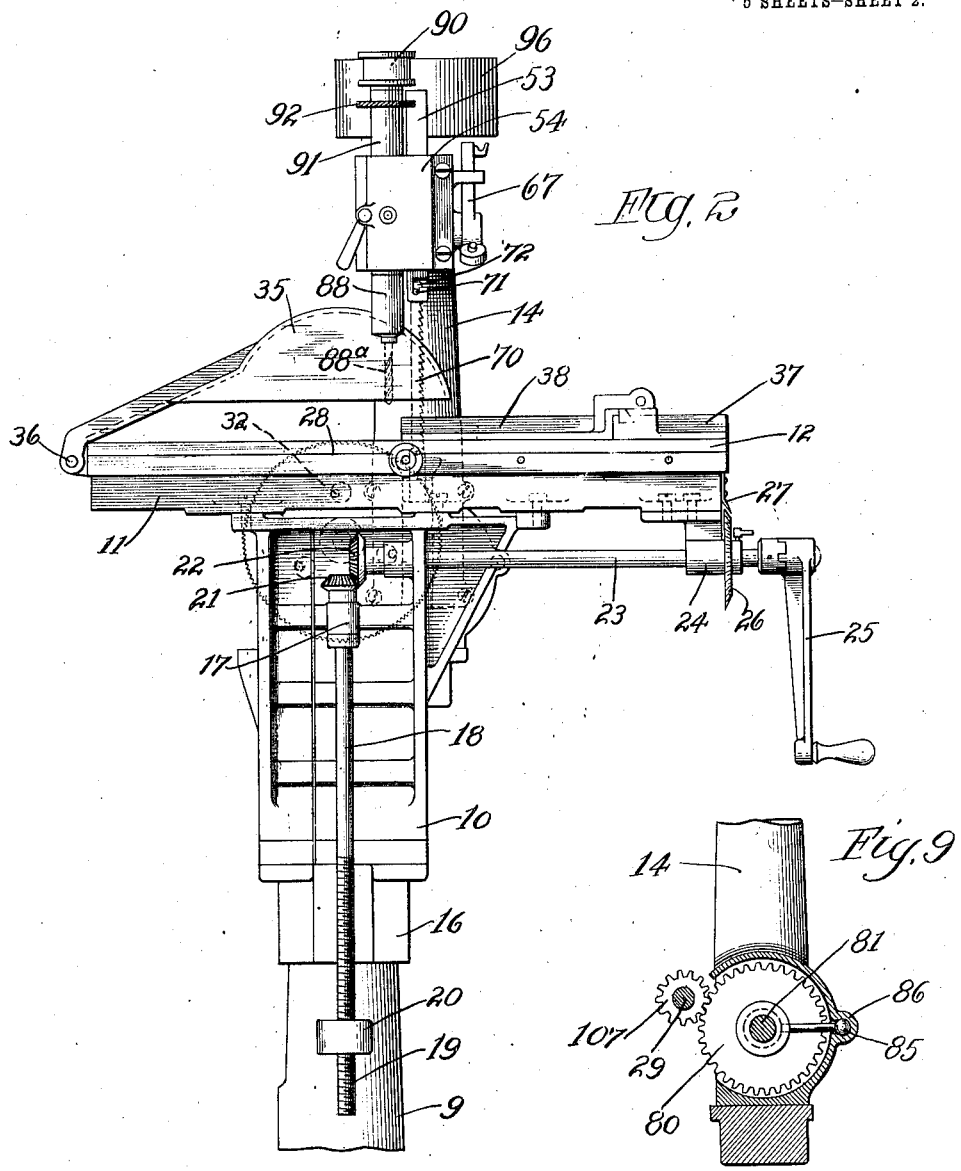

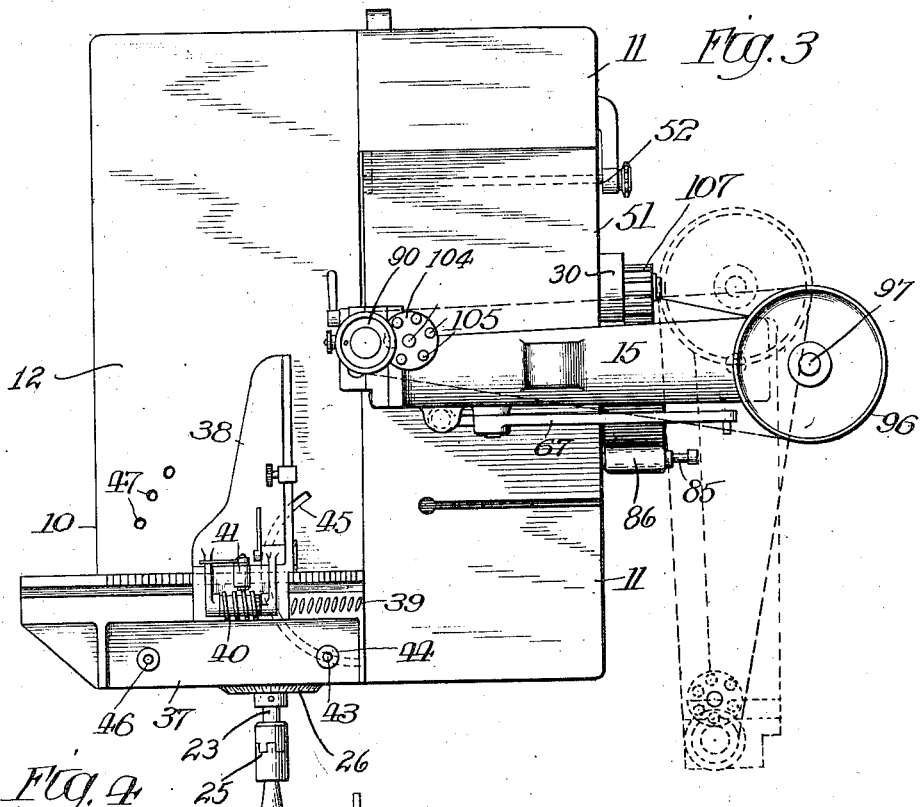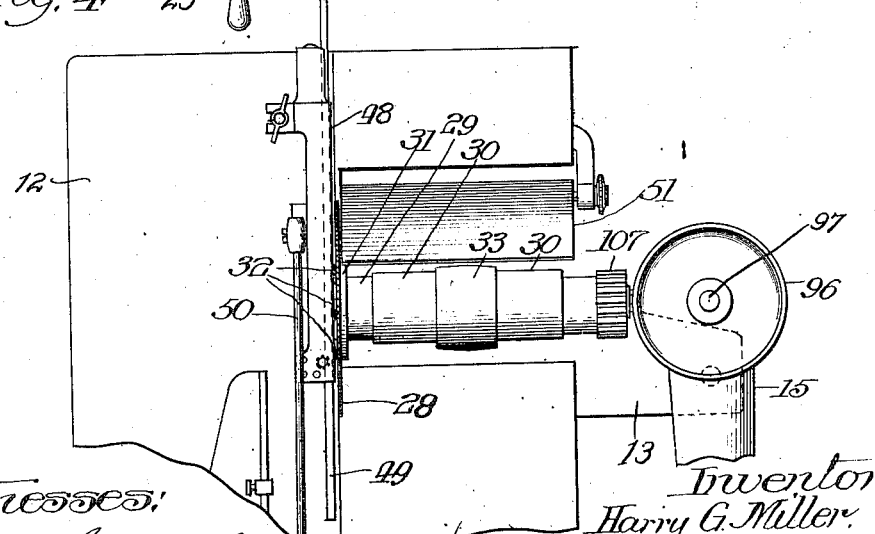

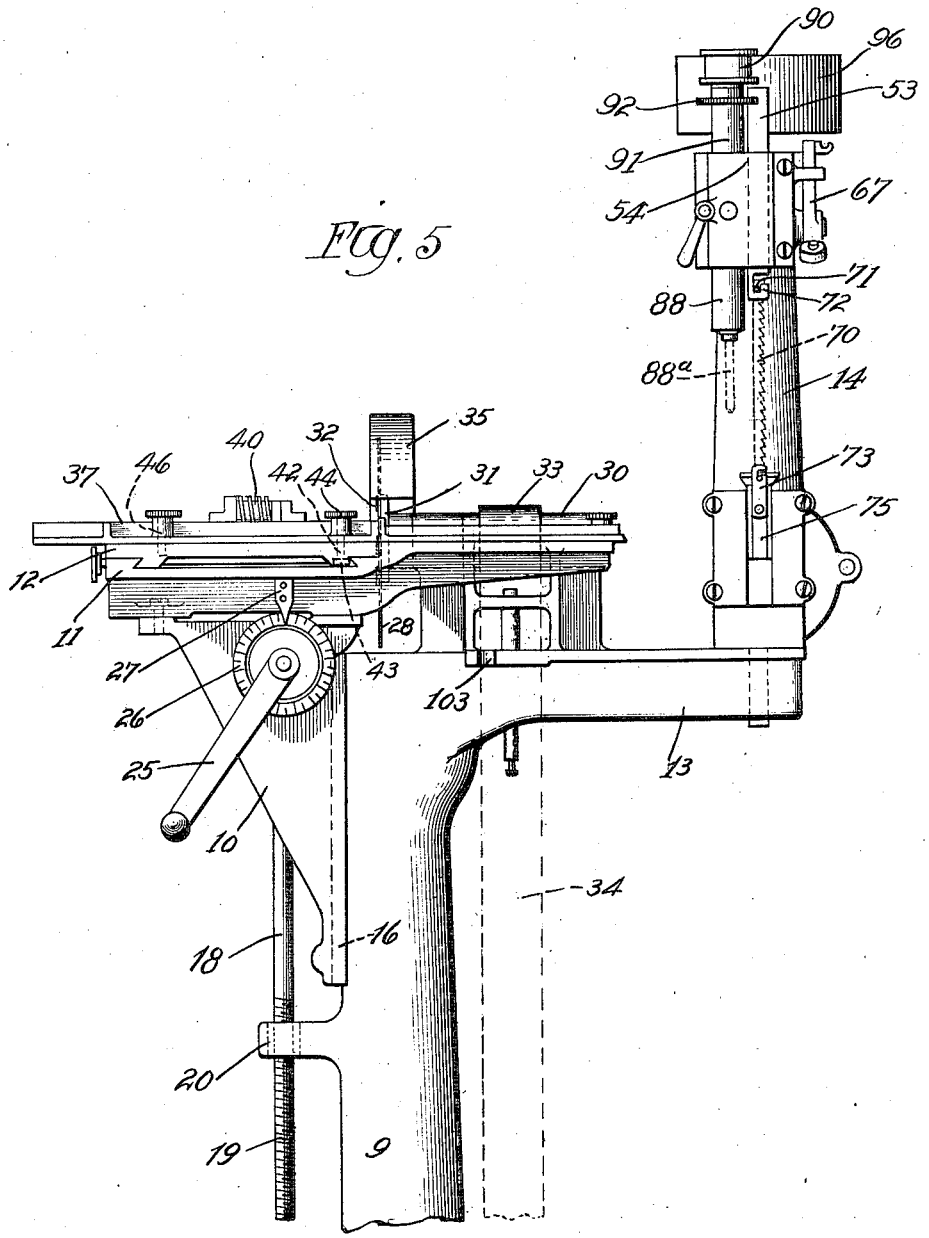

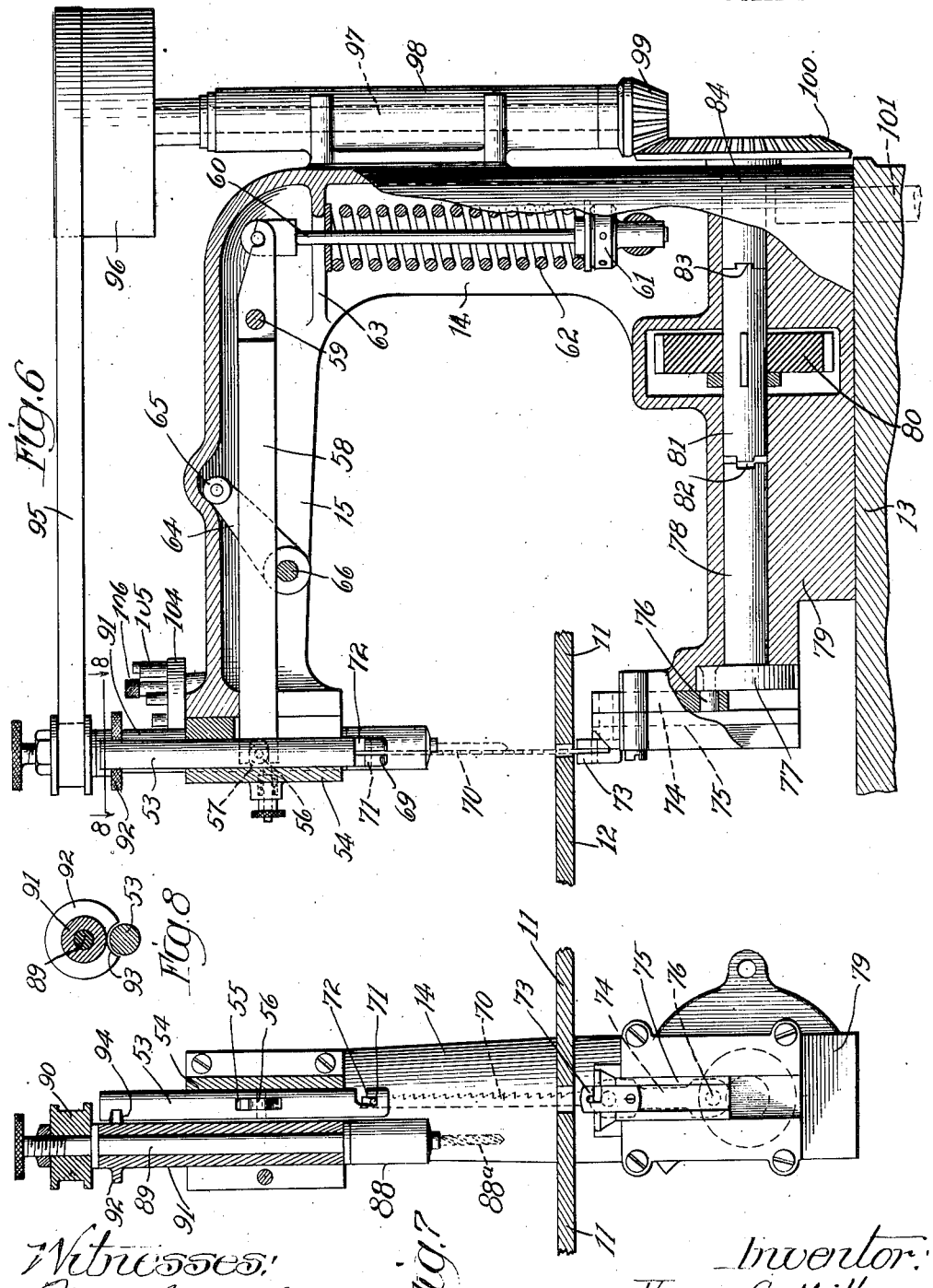

UNITED STATES PATENT OFFICE.

HARRY G. MILLER, OF MILWAUKEE, WISCONSIN, ASSIGNOR TO MILLER SAW-TRIMMER COMPANY OF MICHIGAN, OF ALMA, MICHIGAN, A CORPORATION OF MICHIGAN.

SAWING AND TRIMMING MACHINE WITH ROUTER AND JIG-SAW ATTACHMENT.

1,030,598.              Specification of Letters Patent.      Patented June 25, 1912.

Application filed July 13, 1908. Serial No. 443,402.

*To all whom it may concern:*

Be it known that I, HARRY G. MILLER, a citizen of the United States, residing at Milwaukee, in the county of Milwaukee and State of Wisconsin, have invented new and useful Improvements in Sawing and Trimming Machines with Router and Jig-Saw Attachment, of which the following is a full, clear, concise, and exact description, reference being had to the accompanying drawing, forming a part of this specification.

My invention relates to means for operating upon half-tones, stereotype and electrotype cuts and like articles.

One of the objects of my invention is to provide a machine for preparing half-tones, stereotype and electrotype cuts and like articles for insertion in the printing form. My machine is designed for performing the necessary sequence of operations upon the above articles to prepare the same in such a manner that the articles will properly fit in the form and present the proper printing surface for making the desired impressions.

Another object of my invention is to provide a machine in which a single positioning device will coöperate with the various parts operating upon the above-mentioned articles, whereby the operations upon the article will have a definite relation to one another and there will be no variance in measurement or otherwise which will affect the positioning of the cut in the form or the impression made thereby.

For the purpose of disclosing my invention, I have illustrated in the accompanying drawings one of the practical forms which my invention may take.

In said drawings—Figure 1 is a front elevation of my machine; Fig. 2 is a side elevation of the same; Fig. 3 is a top plan view of my invention; Fig. 4 is a plan view of my machine, with the jig-saw and router-carrying arm swung to one side; Fig. 5 is a front elevation of my machine, with the jig-saw and router arm swung to one side; Fig. 6 is a partial sectional view of my jig-saw and router-carrying arm; Fig. 7 is an end view, partially in section, of the jig-saw and router-carrying arm; Fig. 8 is a detail sectional view on the line 8—8 of Fig. 5, and Fig. 9 is a sectional view on the line 9—9 of Fig. 1.

In the embodiment of my invention illustrated I provide a base or pedestal 9, upon which is mounted a sliding bracket 10, supporting a relatively stationary table 11, which in turn has slidably mounted thereon an auxiliary table 12. A second bracket 13, which is preferably integrally formed with the pedestal 9 and extends transversely upon the opposite side of the pedestal, has pivotally mounted thereon a hollow standard 14 having a transversely extending hollow arm 15. The pedestal 9 is provided with a tongue 16, which engages a groove of counterpart shape formed in the bracket 10. In a lug 17, formed on the bracket 10, is journaled a shaft 18 having a threaded portion 19, which engages a threaded opening formed in a lug 20, integral with the pedestal 9. The upper extremity of the shaft 18 is provided with a beveled gear 21, which meshes with a gear 22 fastened on a horizontal shaft 23 journaled at one extremity in the bracket 10 and at the other extremity in a relatively stationary bracket 24. The outer extremity of the shaft 23 is provided with a crank 25, whereby the shafts 23 and 18 may be manipulated for the purpose of raising and lowering the table upon the pedestal. To the outer extremity of the shaft 23 is also secured a gage-wheel 26, which is graduated or subdivided into points or portions of a pica,—the unit of measurement in typographical matters. These graduations indicated upon the gage-wheel are adapted to coincide with a pointer 27 relatively stationarily mounted upon the table 11. In adjusting the position of the table the gage-wheel which turns with the shaft 23 will indicate the exact elevation imparted to the table in points or sub-divisions of the pica. In practice, the gears 21 and 22 have such relation to each other that for every rotation of the shaft 23 the screw-shaft 18 will be given two revolutions, and the pitch of the threads 19 on this shaft are so regulated with reference to the sub-divisions or points indicated on the gage-wheel that the user of the machine is able to determine by the movement of the gage-wheel the exact vertical movement imparted to the table through the instrumentality of the mechanism already described.

A saw 28 coöperates with the sliding table 12 and is mounted on a shaft 29 journaled in bearings 30 extending upwardly from and formed integrally with the pedestal 9. This saw is preferably mounted on the front face of a trimmer-head 31, which is removably mounted upon the end of the shaft 29 and is provided with trimmers 32 which project through suitable openings in the face of the saw and serve to remove the bur left by the saw on the article which has been cut thereby. The shaft 29 is provided with a suitable pulley 33, which is engaged by a driving belt 34 passing around the same and around a suitable driving wheel (not shown). The saw 28 is provided with a cover 35 hingedly mounted at 36 to the table 11 for protecting the operator against accidentally coming in contact with the saw teeth and preventing chips and dust from flying in the face of the operator.

The positioning gage above described coöperates with the sawing and trimming device to properly shape the cut. The gage positions the work in respect to the trimming device and determines the proper measurement thereof. The sawing and trimming device trims the vertical edges of the cut so that the same will not only be of the proper size but will have the proper shape to lock up rigidly in a predetermined manner in the printing form.

Upon the top of the sliding table 12, at the front end thereof, is mounted a gage for properly positioning the stock or material to be operated upon by the devices of my invention. This gage consists of a gage-plate 37 and a straight edge 38. The gage-plate is provided with a toothed rack 39, in which are adapted to fit the threads of a worm 40 mounted upon the straight edge 38. A suitable locking device 41 is also provided on the straight edge 38 for locking the worm 40 against movement when it has been set to any desired position. The top of the gage-bar or gage-plate 37 is marked with graduations to indicate picas. A zone at one extremity of the worm is graduated to indicate points, the entire circumference of the zone being divided into twelve points, which is equal to one pica, and the teeth of the gage-bar are so constructed with reference to the worm that a complete turn of the worm will move the arm 38 forward a distance of twelve points indicated by the graduations marked on the worm. The gage-bar 37 is secured in position upon the sliding table by a suitable pin 42, which, at its lower end, is provided with a washer 43 adapted to fit in a recess formed beneath the sliding table 12, and at its upper end is provided with a threaded nut 44. The pin is adapted to extend through an arc-shaped slot 45, and when the nut 44 is screwed tight the gage-bar 37 will be securely clamped in position. A second pin 46 is adapted to enter suitable openings 47 in the table 12 to hold the outer end of the bar rigid. By this arrangement the gage-bar 37 may be swung to any angular position relative to the saw in order to get the various degrees of angular cuts desired.

For holding the work in position against movement, I provide a suitable work-holding device, which consists of a casing 48 removably secured to the table 12 by means of a locking nut and a slidable plunger 49, which is adapted to engage one side of the work and force the same against the gage-bar 37. This plunger 49 is preferably moved forward by a handle or rod 50, which also operates a locking mechanism (not shown) for holding the plunger in any position to which it may be moved.

After the cut has been shaped by the sawing and trimming device in connection with the positioning means the next operation is the preparation of the horizontal surfaces so that the desired changes in the character of the impression made by the cut may be effected. To this end, I provide means for preparing the horizontal surfaces of the cut, including the printing surface. This means consists of rotary tools and of reciprocating tools arranged to be secured in tool-holders carried by a pivoted overhanging arm 15.

It is sometimes desired to raise the table. To this end the opening in the top of the table 11, which accommodates the shaft carrying the saw and trimmer, is closed by a movable table part 51, which is hinged, as at 52, at one end, the other end being free and adapted to rest upon the journals of the saw shaft. As the table is raised, which operation brings it above the saw proper, this hinged portion will drop and close the opening which accommodates the saw shaft, giving a greater working area for supporting the work thereon.

The reciprocating tool-holder comprises a vertically movable plunger 53, which is adapted to reciprocate in a suitable journal 54 formed at the end of the hollow transversely extending arm 15. This plunger is provided with a suitable slot 55, in which is journaled a roller 56 adapted to fit within a slot 57 formed in the end of the arm 58 mounted within the hollow arm 15 and pivotally connected thereto at 59. The rear end of this arm is connected with a rod 60, which extends downwardly in the hollow vertical standard 14 and is provided at its lower end with an adjustable nut 61, against which rests a coil spring 62, the opposite end of the spring being adapted to rest against the boss or projection 63 in the hollow arm 14, whereby a tension is exerted upon the rear end of the arm 58, which serves to maintain the plunger 53 in its upward or normal position. The forward end of the arm 58 may be moved downwardly at will by a bell crank lever connection which comprises an arm 64, having a roller 65 thereon adapted to bear upon the upper side of the arm 58. This arm 64 is pivoted at 66 to the transversely extending arm 15 and is connected to the opposite bell crank arm 67, which is mounted exteriorly of the hollow arm 15 and may be manually operated or connected with a foot operating mechanism as may be desired. A suitable coil spring 68 is interposed between one end of the arm 67 and a boss formed on the arm 15, to aid in maintaining this arm in its normal position.

The lower end of the plunger 53 is provided with a slot 69, in which is adapted to fit one end of a jig-saw 70. A transverse pin 71 extending through the jig-saw rests in suitable channels 72 formed in the side walls of the slot 69 to maintain the jig-saw connected to the plunger. The lower end of the jig-saw is connected by a suitable connecting member 73, similar in construction to the connecting member for the plunger 53, with a reciprocating member 74 adapted to reciprocate in a suitable guide 75 mounted beneath the table 11. The lower end of this reciprocating member is connected with an eccentric pin 76 mounted upon the wheel 77 carried on a suitable shaft 78, journaled in a transversely extending arm 79, which arm, in practice, forms a part of the casting constituting the vertical arm 14 and the transverse arm 15.

The shaft 78 is driven from a gear wheel 80, the shaft 81 of which is provided with a square-jawed clutch 82 and is transversely movable so that the two members of the clutch may be moved into and out of engagement as desired. The opposite end of the shaft 81 is provided with a second square-jawed clutch 83, which is adapted to mesh with a second shaft 84, the object of which will more fully appear hereinafter. The shaft 81 is moved transversely by means of a sliding pin 85 mounted in a hollow boss 86 on the arm 79 and having a suitable channel 87 therein, in which channel the gear 80 is adapted to operate. By sliding the pin transversely one way or the other, the gear 80, and with it a shaft 81, may be moved backward and forward to cause the clutches 82 or 83 to engage.

The rotary tool-holder comprises a spindle 88, which is of the usual construction and need not here be described in detail, and in which may be secured any instrument, such as the router 88ª. This spindle is mounted upon the end of a shaft 89, having secured at the upper end thereof a driving pulley 90 and mounted in a journal 91, which is vertically movable in the end of the arm 15. The upper end of the journal is provided with an annular flange 92, which has a recess 93 therein, large enough to receive the reciprocating plunger 53. When, however, the flange is turned so that this recess is out of alinement with the plunger, the flange is adapted to fit in a channel 94 formed in the upper end of the plunger, whereby the movable journal 91 and the plunger 53 are connected together, so that the router may be raised or lowered by the operation of the arm 67. The shaft 89 is driven by a suitable belt 95 passing around the pulley 90 and around a pulley 96 mounted upon a vertically extending shaft 97, supported in a suitable journal 98 formed on the vertically extending arm 14. The lower end of this shaft 97 has secured thereto a bevel gear 99, adapted to mesh with a bevel gear 100 carried on the shaft 84. The casting forming the arms 14, 15 and 79 is provided with a suitable pin 101, which fits in a socket formed in the arm 13, whereby the head carrying the jig-saw and router may be swung into or out of position.

The arm 79 is locked in operating position by means of a bolt 102, which, when the arm is swung into normal position, fits within a slot 103 formed on the arm 13, and which screw-threads into the bottom of the arm 79, so that by tightening the bolt 102 it will engage the flange formed on the arm 13 and rigidly hold the router and jig-saw attachment in position.

Mounted on the arm 15 is a rotating table 104, provided with a plurality of upwardly extending points or projections 105 of varying height, and which, by the rotation of the table 104, may be respectively moved to a position beneath the flange 92. By this arrangement I am enabled to provide an adjustable stop to control the depth of the cut made by the drill or router 86, by controlling the distance the same may be lowered by the arm 67. The difference in height of each of the points is just one point, so that the depth of the cut made by the drill may be measured in conformity to printers' measure. In order to obtain a greater range of measurement, I provide a removable cap 106, which is one-half point in thickness and which may be placed on any one of the points so that a variation of half a point may be obtained.

When the transverse arm is swung into position the table 11 if need be may be raised sufficiently to bring it to a position where the arm 79 can be swung under the same. When the arm 15 is swung into position, the gear 80 will mesh with a driving pinion 107 mounted on the end of the shaft 29.

The operation of the machine may be more clearly understood if first I point out the nature of the cuts as they come from the maker of the same. When the cuts are received in the printing office from the maker the blocks on which they are mounted, or other bases, are not square or the sides do not form true right angles so that the same will lock up properly in the form. Neither are the bases or blocks cut accurately to the proper measure so that they will lock up in the form. Furthermore, especially when a number of cuts have been made, say, for insertion in different newspapers, it is necessary that some of the printing matter must be changed either by taking out some of the printing matter or by substituting for some of the printing matter other printing matter. With this understanding the operation of the machine in the preparation of a cut may be more fully appreciated. The first operation of preparing the cut is to prepare the vertical sides so that the angles of the cut will all be true and the cut will have the proper measurement to fit in the form. In this operation one of the vertical edges is given a slight trim by the rotary sawing and trimming device to true that edge. This edge is then used as a basis for the remaining operations. After this edge has been trimmed the movable member of the gage is set to give the proper measurement to the cut in one direction, say, the width. The trimmed edge is then placed against the movable member and the opposite edge or vertical side is trimmed. This gives two sides of the cut with proper dimensions and both sides are perfectly straight. The cut is then turned to one of the remaining untrimmed sides and this side is likewise given a slight trim to true it up with respect to the other two trimmed sides. The movable member of the gage is again set to give the cut the proper dimensions, say, lengthwise, and the remaining edge or vertical side of the cut is trimmed. The vertical edges of the cut are now trimmed in such a manner that all the edges are perfectly true, forming the correct angles and having the correct measurement to cause the cut to fit in the form in such a manner that it will properly lock up and in such a manner that no other adjustment is necessary.

After the vertical edges of the cut have been prepared the horizontal surfaces may be prepared. The cut is not always of the proper vertical height to fit in the form, or, as it is technically expressed, is not "type high". In order that the horizontal surfaces of the cut may be used, the cut is turned over on its face and positioned by the same positioning device which was used with respect to the sawing and timming device beneath the rotary tool-holder. The proper tool is inserted and the rotary toolholder is lowered until it is in the exact position to plane the bottom surface of the cut "type high". By the operation of the sliding-table backward and forward and by advancing the cut by means of the movable member of the gage the bottom horizontal surface of the cut is trimmed until the cut is exactly "type high". After this operation the cut is turned over, and, if there is subject-matter in the printing surface which must be removed the proper tool is inserted in the rotary tool-holder and this subject-matter is routed out; or, if the subject-matter is such that it requires curved lines, the reciprocating tool, which may be in the form of a reciprocating saw, is inserted in the reciprocating tool-holder and the subject-matter to be taken out is cut out by removing the entire portion of the block carrying this subject-matter. Likewise, if new matter is to be inserted in place of that which has been taken out, the proper tool may be inserted in the rotary tool holder to drill out the old subject-matter and form a hole or opening in the block for the insertion of say a type, or if it requires more space than merely one type, the reciprocating saw or other tool may be used for cutting out from the block sufficient material to permit the insertion of the new subject-matter. It will be seen that in all of these operations, however, the same positioning device is used to position and measure the work. By this arrangement there is no variance to the units of measurement and the cut will always properly fit in the form and lock up in such a manner as to give the best results.

Having described my invention, what I claim as new and desire to secure by Letters Patent, is:

1. A machine of the character described comprising, in combination, a common work supporting table, a shaft mounted substantially parallel with said table, a rotary edge cutting tool carried by said shaft, a rotary tool holder and a reciprocating tool holder carrying rotary and reciprocating tools and arranged at right angles to the table, and a gage common to all of said tools mounted on said table and having a fixed zero point with respect to all of the tools, all of said tools being arranged in a definite relation to the zero point to cause the work performed by each tool to have a definite relation to the work performed by the other tools.

2. A machine of the character described comprisng, in combination, a common work supporting table, a shaft mounted substantially parallel with said table, a rotary edge cutting tool carried by said shaft and comprising a combined saw and trimmer, a rotary tool holder and a reciprocating tool holder carrying rotary and reciprocating tools and arranged at right angles to the table, and a gage common to all of said tools mounted on said table and having a fixed zero point with respect to all of the tools, all of said tools being arranged in a definite relation to the zero point to cause the work performed by each tool to have a definite relation to the work performed by the other tools.

3. A machine of the character described comprising, in combination, a common work supporting table, a shaft mounted substantially parallel with said table, a rotary edge cutting tool carried by said shaft, a rotary tool holder and a reciprocating tool holder carrying rotary and reciprocating tools and arranged at right angles to the table, and a gage comprisng a relatively stationary member and a movable member common to all of said tools mounted on said table and having a fixed zero point with respect to all of the tools, all of said tools being arranged in a definite relation to said zero point to cause the work performed by each tool to have a definite relation to the work performed by the other tools.

4. A machine of the character described comprising, in combination, a common work supporting table, a shaft mounted substantially parallel with said table, a rotary edge cutting tool carried by said shaft, a rotary tool holder and a reciprocating tool holder carrying rotary and reciprocating tools arranged at right angles to the table, all of said tools being operative in substantially the same vertical plane, and a gage common to all of said tools mounted on said table and having a fixed zero point with respect to all of the tools, all of said tools being arranged in a definite relation to said zero point to cause the work performed by each tool to have a definite relation to the work performed by the other tools.

5. A machine of the character described comprising, in combination, a common work supporting table, a shaft mounted substantially parallel with said table, a rotary edge cutting tool carried by said shaft, a rotary tool holder and a reciprocating tool holder carrying rotary and reciprocating tools and arranged at right angles to the table, and a gage common to all of said tools mounted on said table and having a fixed zero point with respect to all of the tools and pivoted to move in the arc of a circle having its center on the vertical plane in which all of said tools operate, all of said tools being arranged in a definite relation to the zero point of said gage to cause the work performed by each tool to have a definite relation to the work performed by the other tools.

6. A machine of the character described comprising, in combination, a common work supporting table, a shaft mounted substantially parallel with said table, a rotary edge cutting tool carried by said shaft, a rotary tool holder and a reciprocating tool holder carrying rotary and reciprocating tools and arranged at right angles to the table, a gage common to all of said tools mounted on said table and having a fixed zero point with respect to all of the tools and pivoted to move in the arc of a circle having its center on the vertical plane common to all of said tools and comprising a relatively stationary member and a movable member, all of the tools being arranged in a definite relation to the zero point of the gage to cause the work performed by each tool to have a definite relation to the work performed by the other tools.

7. A machine of the character described comprising, in combination, a common supporting table, a shaft mounted substantially parallel with said table, a rotary edge cutting tool carried by said shaft, a rotary tool holder and a reciprocating tool holder carrying rotary and reciprocating tools and arranged at right angles to the table carried by a single supporting overhanging arm, and a gage common to all of said tools mounted on said table and having a fixed zero point with respect to all of the tools, all of said tools being arranged in a definite relation to said zero point to cause the work performed by each tool to have a definite relation to the work performed by the other tools.

8. A machine of the character described comprising, in combination, a common supporting table, a shaft mounted substantially parallel with said table, a rotary edge cutting tool carried by said shaft, a rotary tool holder and a reciprocating tool holder carrying rotary and reciprocating tools and arranged at right angles to the table, carried by a single detachable overhanging arm, and a gage common to all of said tools mounted on said table and having a fixed zero point with respect to all of the tools, all of said tools being arranged in a definite relation to said zero point to cause the work performed by each tool to have a definite relation to the work performed by the other tools.

9. A machine of the character described comprising, in combination, a common work supporting table, a shaft mounted substantially parallel with said table, a rotary edge cutting tool carried by said shaft, a rotary tool holder and a reciprocating tool holder carrying rotary and reciprocating tools and arranged at right angles to the table, carried by a single pivoted detachable overhanging arm, and a gage common to all of said tools mounted on said table and having a fixed zero point with respect to all of the tools, all of said tools being arranged in a definite relation to said zero point to cause the work performed by each tool to have a definite relation to the work performed by the other tools.

10. The combination with a base or support, of a work supporting table, a driving shaft arranged on said base, a substantially U shaped frame pivotally mounted on said base and having one leg thereof arranged beneath the table and the other leg arranged above the table, a reciprocating tool member mounted on said lower leg, a rotary tool holder arranged on said upper leg, a reciprocating tool member arranged on said upper leg, a driving mechanism for the rotary tool holder, a driving mechanism for at least one of said reciprocating tool members, a common driving device for operating said mechanisms, arranged on said member and having a detachable connection with the driving shaft.

11. The combination with a base or support, of a work supporting table, a driving shaft arranged on said base, a substantially U shaped frame detachably mounted on said base and having one leg thereof arranged beneath the table and the other leg arranged above the table, a reciprocating tool member mounted on said lower leg, a rotary tool holder arranged on said upper leg, a reciprocating tool member arranged on said upper leg, a driving mechanism for the rotary tool holder, a driving mechanism for at least one of said reciprocating tool members, a common driving device for operating said mechanisms, arranged on said member and having a detachable connection with the driving shaft.

12. The combination with a base or support, of a work supporting table mounted thereon, a driving shaft on said base, a supporting frame mounted on said base, a rotary tool holder carried on said frame, a reciprocating tool operating mechanism carried on said frame, a driving device on said frame detachably connected with the shaft, a clutching mechanism for connecting either said rotary tool holder or reciprocating tool mechanism with the driving mechanism on the frame.

13. In a device of the character described, the combination with a work supporting table, of an over-hanging arm, a rotary tool holder mounted on said arm, a reciprocating member mounted in said arm adapted to receive one end of the jig-saw, a shaft having a driving connection with said rotary tool holder, a second shaft having a reciprocating member operated thereby and adapted to receive the opposite end of said jig-saw, and a driving shaft having a clutch connection with the first two mentioned shafts whereby either the jig-saw or the rotary tool holder may be operated.

14. In a device of the character described, the combination with a work supporting table, of an over-hanging arm, a lever pivoted on said arm, a reciprocating member adapted to receive one end of a jig-saw mounted on the end of said lever, means connected on the opposite side of said lever having a tendency to hold said reciprocating member in its highermost position, reciprocating means beneath said table for receiving the opposite end of said jig-saw, means for driving said reciprocating means, and a rotary tool holder mounted on said overhanging arm and having a separable connection with the first mentioned reciprocating member.

In witness whereof, I have hereunto subscribed my name in the presence of two witnesses.

HARRY G. MILLER.

Witnesses:
W. PERRY HALM,
M. R. ROCHFORD.